United States Patent [19]

Bhatt et al.

[11] Patent Number: 4,816,034
[45] Date of Patent: Mar. 28, 1989

[54] WATER SOLUBLE DIRECT BLACK POLYAZO DYESTUFFS MIXTURE

[75] Inventors: Girish I. Bhatt; Subrao S. Kulkarni, both of Atul; Chandrashekhar B. Upasani, Dist. Bharuch (Gujarat); Mukundbhai Bhatt, Atul, all of India

[73] Assignee: The Atul Products Limited, Gujarat, India

[21] Appl. No.: 895,752

[22] Filed: Aug. 12, 1986

[30] Foreign Application Priority Data

Aug. 16, 1985 [IN] India ..................................... 216/85

[51] Int. Cl.$^4$ ............................................. C09B 49/00
[52] U.S. Cl. ........................................... 8/641; 8/437; 8/680; 8/681; 8/687; 8/917; 8/918; 8/919; 8/924
[58] Field of Search ................... 8/641, 680, 687, 681

[56] References Cited

U.S. PATENT DOCUMENTS 3,927,963 12/1975 Papa et al. ............................... 8/644
4,235,773 11/1980 Huhne et al. ......................... 534/680
4,624,708 11/1986 Solodar .................................. 106/22

FOREIGN PATENT DOCUMENTS 1417428 12/1975 United Kingdom .

Primary Examiner—A. Lionel Clingman
Attorney, Agent, or Firm—Fitch, Even, Tabin & Flannery

[57] ABSTRACT

A water soluble direct black polyazo dyestuffs mixture comprising trisazo dyestuffs, polyazo dyestuffs and disazo dyestuff.

18 Claims, 3 Drawing Sheets

FORMULA IV    FIG. 13

FORMULA V    FIG. 14

FORMULA VI    FIG. 15

FORMULA VII    FIG. 16

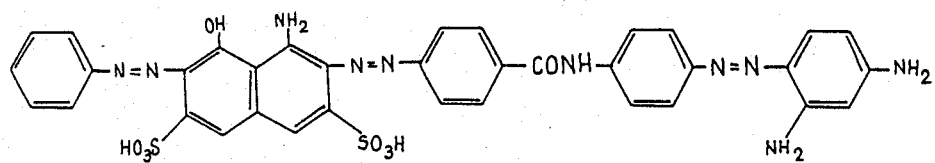
FORMULA I     FIG. 7
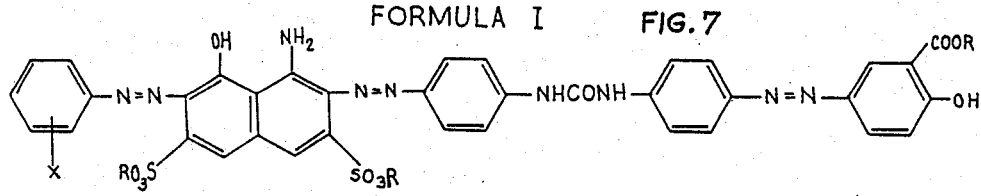
FORMULA IA     FIG. 8
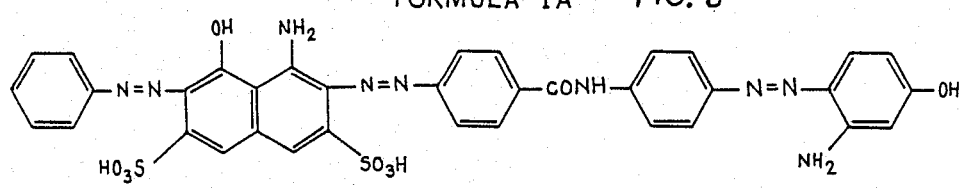
FORMULA II     FIG. 9
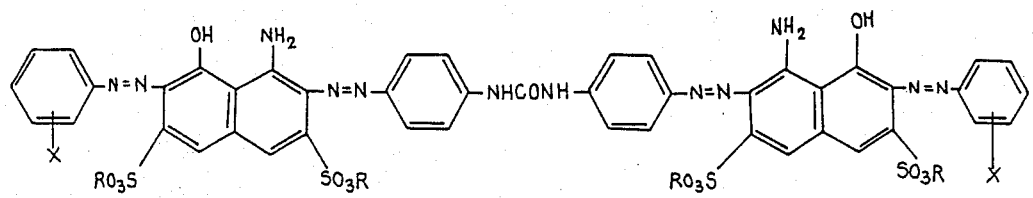
FORMULA IIA     FIG. 10
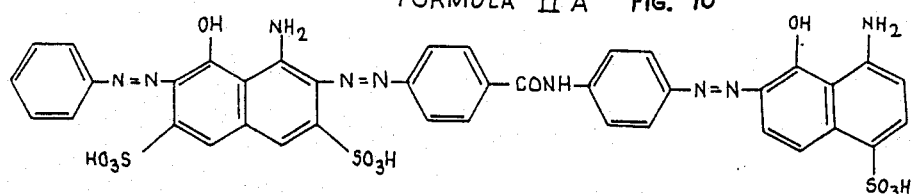
FORMULA III     FIG. 11
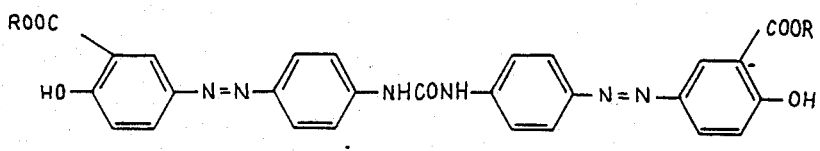
FORMULA IIIA     FIG. 12

WATER SOLUBLE DIRECT BLACK POLYAZO DYESTUFFS MIXTURE

This invention relates to a water soluble direct black polyazo dyestuffs mixture.

Water soluble direct black benzidine dyestuff [Direct Black 38 (C.I. No. 30235) Ref. Colour Index published by Society of Dyers and Colourists, the United Kingdom and American Association of Textile Chemists and Colourists, the United States of America] imparts a jet black shade on cellulose material such as cotton or jute fibres or paper, wool, silk, nylon or leather. Benzidine is reported to be carcinogenic and has already been banned in some countries and is being banned in several other countries. Strenuous efforts are, therefore, in progress to find out water soluble direct black dyestuffs which are not benzidine based and which are substitutes for benzidine based water soluble direct black dyestuff.

British patent specification No. 1467656 discloses a water soluble trisazo dyestuff of the formula III of the accompanying drawings. It is mentioned in British patent specification No. 1467656 that this dyestuff imparts a violet black colour to natural or synthetic polyamide fibres such as wool or nylon but is not particularly suited to market requirements. British patent specification No. 1467656 also discloses a water soluble trisazo dyestuffs mixture of the formulae I, II and III of the accompanying drawings or their salts such as sodium salts. It is mentioned in British patent specification No. 1467656 that this dyestuffs mixture imparts black shade with reddish or green tinges on natural and regenerated cellulose fibres, natural and synthetic polyamide fibres and leather. It is also mentioned in British patent specification No. 1467656 that this dyestuffs mixture, wherein the percentage of the dyestuffs of the formulae I and II exceed 70 and 50 respectively will not be suitable and commercially acceptable for want of acid and alkali sensitivity of its dyeings. Dyestuffs of the formulae I and II have been disclosed in British patent specifications Nos. 1327915 and 1417428.

As a result of extensive research and experiments we have been able to obtain a water soluble direct black polyazo dyestuffs mixture, which is a selective admixture of polyazo dyestuffs and has been found to possess increased tinctorial value as compared to the trisazo dyestuffs mixture of the formulae I, II and III and impart jet black colour on cellulose materials such as cotton or jute fibres or paper, wool, silk, nylon or leather.

Accordingly, the object of the present invention is to provide a water soluble direct black polyazo dyestuffs mixture.

DESCRIPTION OF THE DRAWINGS

FIGS. 7, 9 and 11 are formulas of dyestuffs as described in the specification;

FIGS. 8, 10 and 12 are general formulas of polyazo dyestuffs used in the invention;

FIG. 13 is a general formula of a trisazo dyestuff used in the invention;

FIG. 14 is a general formula of a trisazo dyestuff used in the invention;

FIG. 15 is a general formula of a trisazo dyestuff used in the invention; and

FIG. 16 is a general formula of a disazo dyestuff used in the invention.

Figure 1:
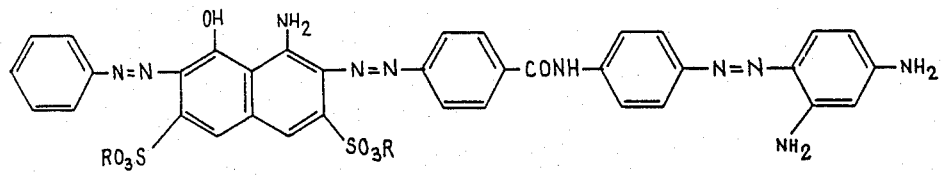
FIGS. 1, 2, 3, 3A, 4A, 5A and 6 are general formulas of dyestuffs used in Examples 1 and 2.
Figure 1:
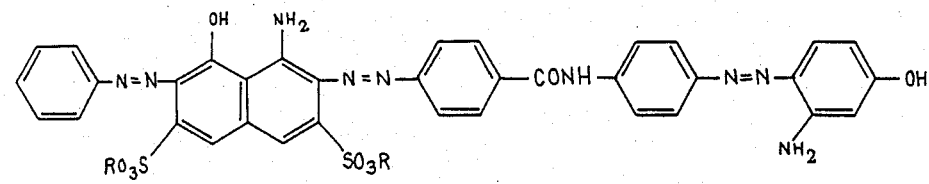
Figure 1:
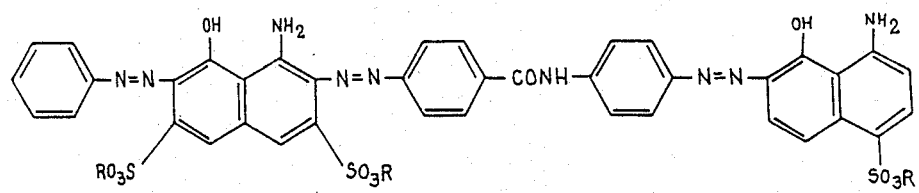
Figure 1:
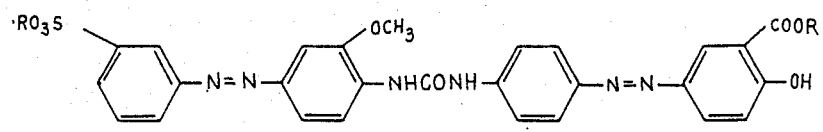
Figure 1:
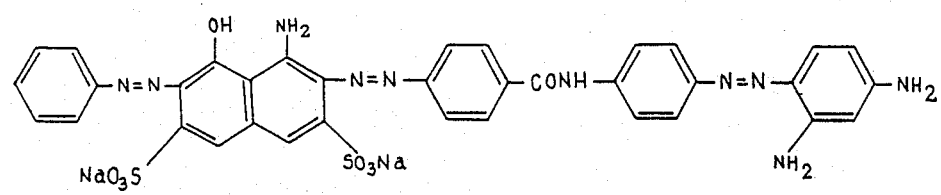

According to the present invention there is thus provided a water soluble direct black polyazo dyestuffs mixture comprising the following ingredients in the respective proportions:

i. 20 to 30 parts by weight of the trisazo dyestuff of the formula IV of the accompanying drawings, wherein R is hydrogen, sodium or potassium;

ii. 40 to 60 parts by weight of the trisazo dyestuff of the formula V of the accompanying drawings, wherein R is as defined above;

iii 5 to 15 parts by weight of the trisazo dyestuff of the formula VI of the accompanying drawings, wherein R is as defined above;

iv. 5 to 10 parts by weight of the polyazo dyestuffs mixture of the formula IA, IIA and IIIA of the accompanying drawings, the ratios of the compounds of the formulae IA, IIA and IIIA in the mixture being in the range of about 10 to about 15: about 3 to about 5: about 0.5 to about 2, respectively, with the preferred ratio of the mixture being about 12: about 4: about 1: and wherein R is as defined above and X is lower alkyl group such as methyl or ethyl group, lower alkoxy group such as methoxy or ethoxy group, chloro or nitro group, carboxy or sulfonic acid group or hydrogen at the 2, 3, or 4 position; and v. 2 to 5 parts by weight of the disazo dyestuff of the formula VII of the accompanying drawings, wherein R is as defined above.

Preferably, the water soluble direct black polyazo dyestuffs mixture of the present invention comprises the ingredients in the following proportions:

ia. 22 to 27 parts by weight of the trisazo dyestuffs of the formula IV of the accompanying drawings, wherein R is as defined above;

iia. 50 to 60 parts by weight of the trisazo dyestuffs of the formula V of the accompanying drawings, wherein R is as defined above;

iiia. 11 to 13 parts by weight of the trisazo dyestuff of formula VI of the accompanying drawings, where R is as defined above;

iva. 5 to 20 parts by weight of the polyazo dyestuffs mixture of the formulae IA, IIA and IIIA of the accompanying drawings, wherein R and X are as defined above; and va. 2 to 5 parts by weight of the disazo dyestuff of the formula VII of the accompanying drawings, wherein R is as defined above.

According to an embodiment of the present invention, the polyazo dyestuffs mixture of the present invention is formed by mechanically mixing the ingredients.

According to another embodiment of the present invention, the polyazo dyestuffs mixture of the present invention is formed by first forming dyestuffs of the formulae IV, V and VI in situ in known manner and thereafter mechanically mixing the mixture of dyestuffs of the formulae IV, V and VI with the remaining ingredients.

The ingredients of the dyestuffs mixture of the present invention may be mixed in the dry state. Alternatively, the ingredient(s) of the dyestuffs mixture of the present invention may be mixed in the wet state and the dyestuffs mixture is dried, preferably, at a temperature between 75° to 90° C. In the dry state mixing all the ingredients are in the dry state. In wet state mixing the ingredients are wet with water. No other solvent except water is involved. Wet state mixing is preferably done by employing filter cakes corresponding to the required quantity of dry ingredients. Filter cakes generally contain 30 to 40% dry dye content.

Dyestuffs of the formulae IV and V have been disclosed in British patent specification Nos. 1327915 and 1417428 and impart reddish black and greenish black shades respectively to cellulose materials such as cotton or jute fibres or paper, nylon, wool, silk or leather.

Dyestuff of the formula VI has been disclosed in British patent specification no. 1467656 and imparts violet black shade to cellulose materials such as cotton or jute fibres or paper, nylon, wool, silk or leather.

Dyestuffs mixture of the formulae IA, IIA and IIIA has been disclosed in our copending Indian patent application No. 217/BOM/85 and imparts green colour to cellulosic materials such as cotton or jute fibres or paper.

Dyestuff of the formula VII of the accompanying drawings id Direct Yellow 44 (Ref. C.I. No. 29000 in Colour Index) and imparts yellow colour to cellulose materials such as cotton or jute fibres or paper, nylon, wool, silk or leather.

The following examples are illustrative of the present invention, in which all the parts are by weight:

EXAMPLE 1

22.7 parts of 4,4'-Diaminobenzanilide was stirred with 98 parts of water and 58.7 parts of hydrochloric acid (30% w/v) for 30 minutes and cooled to 0° C. with ice. The fraction mixture was tetrazotised at 0°–5° C. with 13.8 parts of sodium nitrite in 22 parts of water and stirred for 1 hours and the excess nitrous acid was destroyed in sulphamic acid. 58.7 parts of sodium chloride was added to the reaction mixture followed by a solution of 30.33 parts of 1-amino-8-hydroxy-naphthalene-3,6-disulfonic acid in 155 parts of water and 15.65 parts of sodium hydroxide (25% w/v) over a period of 2 hours at 5°–10-° C. The reaction mixture was stirred for 1 hour and its pH was raised to 2.0 and 2.3 using 5 parts of sodium acetate. The reaction mixture was again stirred at 5°–10° C. for 6–8 hours followed by addition of 98 parts of sodium chloride and cooling to 0° C.

To this was added aniline diazo prepared from 7.83 parts of aniline, 40 parts of ice, 29.33 parts of hydrochloride acid (30% w/v) and 5.83 parts of sodium nitrite at 0°–2° C. followed by a slurry of 58.7 parts of sodium carbonate in 120 parts of water to raise the pH to 9.0 to 9.2. The reaction mixture was stirred for 4 hours at 0.2° C. and its temperature was raised to 15°–20° C. in 2 hours. Test for aniline diazo was negative.

To this was added a solution of 2.74 parts of 1-amino-8-naphthol-4-sulfonic acid in 98 parts of water and 3.9 parts of soda ash and the mixture was stirred for 2 hours at 20° C. A solution made from 5.09 parts of m-aminophenol, 98 parts of water and 0.98 parts of sodium carbonate was then added to the reaction mixture and stirred for 2 hours at 20°–25° C.

The reaction mixture was neutralised to pH 6.8 to 7.2 using 17.26 parts of sulfuric acid as 20% w/v solution in water and was stirred for 1 hours at 20°–25° C. 2.35 parts of m-Phenylenediamine as 10% aqueous solution was then added to the reaction mixture and stirred for 4 hours at 25°–30° C.

Figure 2:
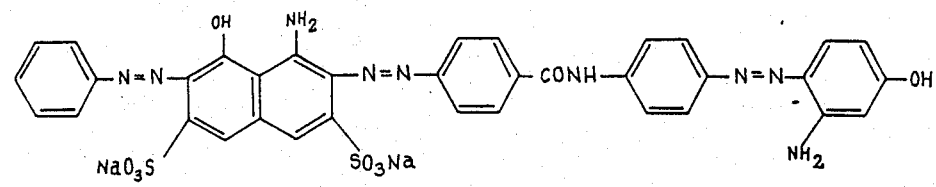
Figure 3:
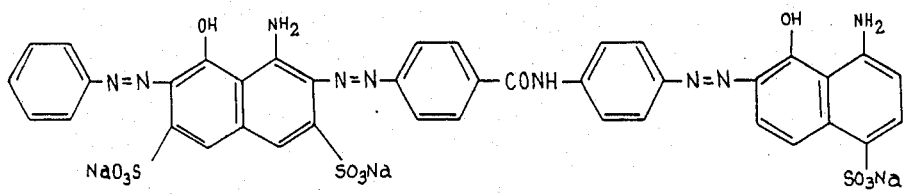

The dyestuffs mixture of the formulae shown in FIGS. 1 to 3 of the accompanying drawings, was salted out from the reaction mixture using 78 parts of common salt and filtered. The filter cake (dry content 85 parts) was mixed with the dyestuffs mixture of the formulae shown in FIGS. 3A, 4A and 5A (12:4:1 respectively) of the accompanying drawings (10 parts) and the dyestuff of the formula shown in FIG. 6 of the accompanying drawings (5 parts) in a mixer. The resulting final water soluble direct black polyazo dyestuffs mixture was dried in an electric oven at 90°–95° C.

Figure 3A:
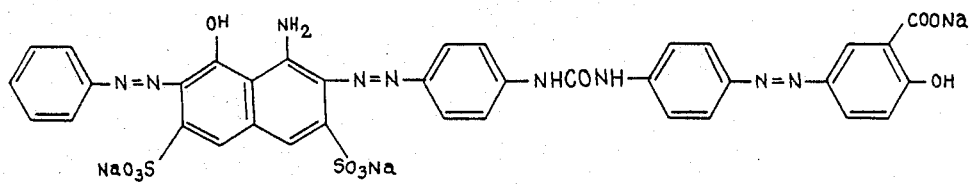
Figure 4A:
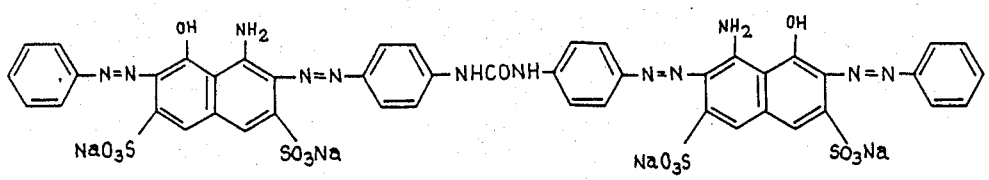
Figure 5A:
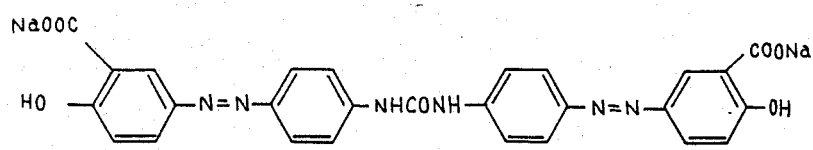

The dyestuffs of the formulae shown in FIGS. 3A, 4A and 5A has been disclosed in our copending Indian patent application no. 217/BOM/85.

EXAMPLE 2

Figure 6:
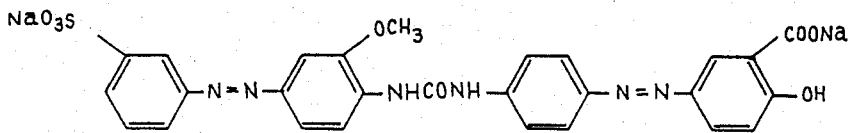

23 parts of the triazo dyestuff of the formula shown in FIG. 1 of the accompanying drawings, 52 parts of the triazo dyestuff of the formula shown in FIG. 2 of the accompanying drawings, 12 parts of the triazo dyestuff of the formula shown in FIG. 3 of the accompanying drawings, 9 parts of the polyazo dyestuffs mixture of the formulae shown in FIGS. 3A, 4A and 5A (12:4:1 respectively) of the accompanying drawings and 4 parts of the disazo dyestuff of the formula shown in FIG. 6 of the accompanying drawings were mixed in a mixer to obtain a water soluble direct black polyazo dyestuffs mixture.

Using the dyestuffs mixtures of Examples 1 and 2, cotton fibres, jute fibres, paper, wool, silk, nylon and leather were dyed in known manner to obtain jet black colour on such materials. The tone and fastness properties of the above materials dyed with the dyestuffs mixtures of Examples 1 and 2 were found to be as good as those obtained with Direct Black 38 (C.I. No. 30235 in Colour Index) under identical dyeing conditions. The tone and fastness properties of the above materials dyed with the dyestuffs mixtures of Examples 1 and 2 were also found to be far superior to those obtained with the dyestuffs mixture of the formulae I, II and III of British patent specification No. 1467656 under identical dyeing conditions. It is, therefore, inferred that addition of the dyestuffs mixture of the formulae IA, IIA and IIIA and the dyestuff of the formula VII to the dyestuffs mixture of the formulae IV, V and VI and also selection of the various ingredients of the dyestuffs mixture of the present invention in the respective proportions set forth herein impart a synergestic effect to the dyestuffs mixture of the formula IV, V and VI thereby improving the dyeing properties of the dyestuff mixture of the formulae IV, V and VI. The fact that the percentage of the dyestuff of the formula IV can be 20 to 30 parts by weight adds weightage to this inference, so also the fact that the suitability and commercial acceptability of the dyestuffs mixture of the present invention will not be affected even if the percentage of the dyestuff of the formula V is above 50 and up to 60.

The dyestuffs mixture of the present invention is thus an ideal substitute for Direct Black 38.

What is claimed is:

1. A water soluble direct black polyazo dyestuffs mixture comprising the following ingredients in the respective proportions:

i. about 20 to about 30 parts by weight of a trisazo dyestuff having a formula,

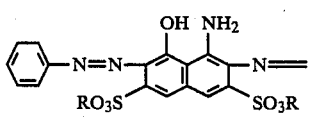

-continued

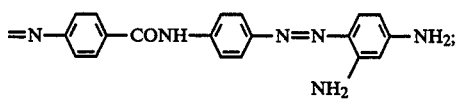

ii. About 40 to about 60 parts by weight of a trisazo dyestuff having a formula,

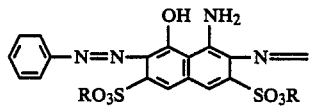

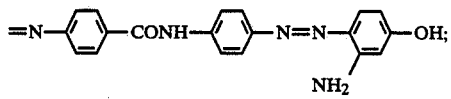

iii. About 5 to about 15 parts by weight of a trisazo dyestuff having a formula

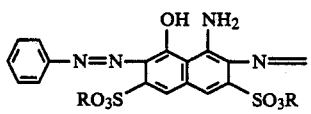

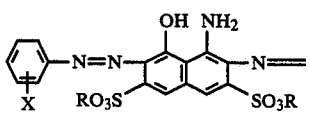

iv. About 5 to about 10 parts by weight of a polyazo dyestuffs mixture including a first polyazo dyestuff having a formula,

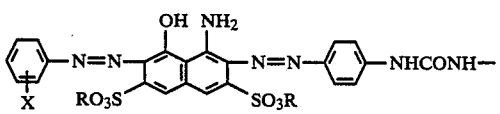

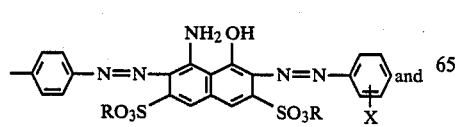

a second polyazo dyestuff having a formula, a third polyazo dyestuff having a formula,

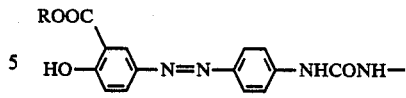

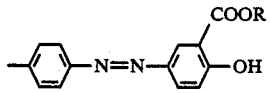

the first, second and third polyazo dyestuffs being in a ratio in the range of about 10 to about 15: about 3 to about 5: about 0.5 to about 2, respectively; and v. 2 to 5 parts by weight of a disazo dyestuff having a formula,

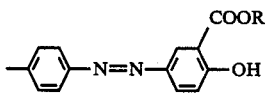

wherein R is hydrogen, sodium or potassium and X is lower alkyl, lower alkoxy, chloro, nitro, carboxy, sulfonic or hydrogen at the 2, 3, or 4 position.

2. A dyestuffs mixture as claimed in claim 1, which comprises the ingredients in the following proportions:
ia. 22 to 27 parts by weight of the trisazo dyestuffs of the formula,

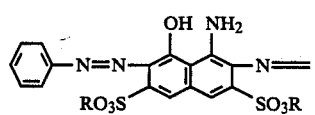

iia. 50 to 60 parts by weight of the trisazo dyestuffs of the formula,

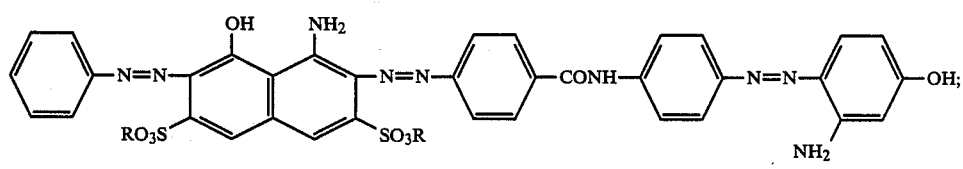

iiia. 11 to 13 parts by weight of the trisazo dyestuffs of the formula,

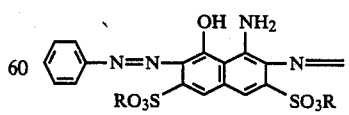

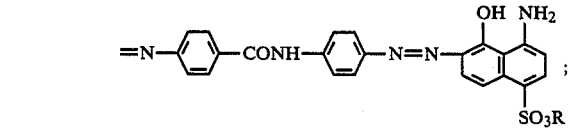

iva. 5 to 10 parts by weight of the polyazo dyestuffs mixture of the formula,

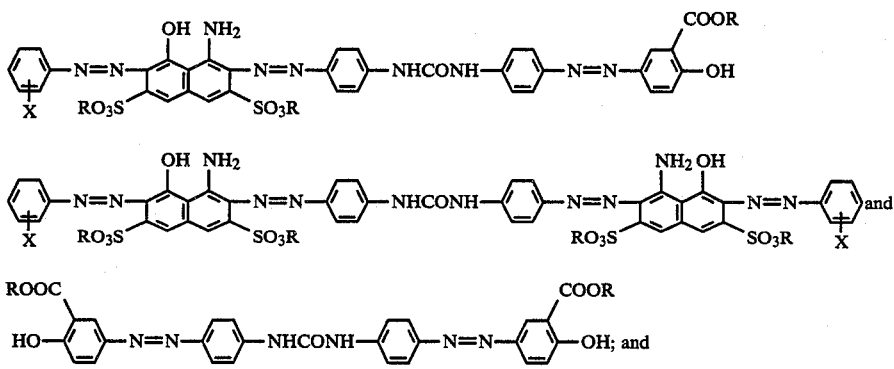

va. 2 to 5 parts by weight of the disazo dyestuffs of the formula,

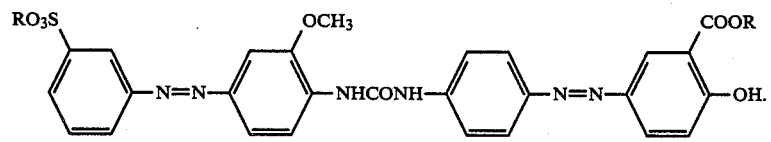

3. A dyestuffs mixture as claimed in claim 1, which is formed by mechanically mixing the ingredients.

4. A dyestuffs mixture as claimed in claim 2, which is formed by mechanically mixing the ingredients.

5. A dyestuffs mixture as claimed in claim 1, which is formed by first synthesizing the trisazo dyestuffs mixture of the formulae,

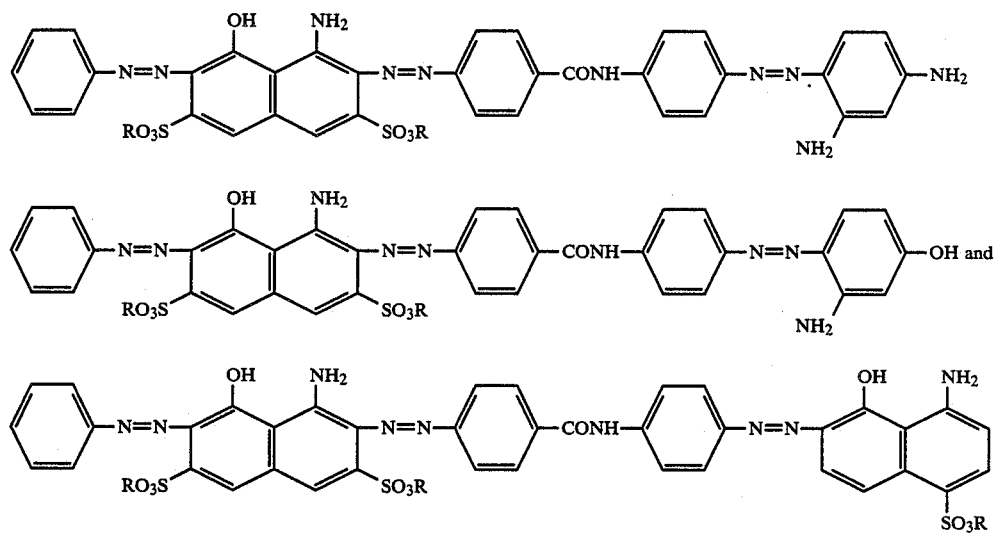

in situ and thereafter mechanically mixing the mixture of trisazo dyestuffs with the first, second and third polyazo dyestuffs and disazo dyestuff.

6. A dyestuffs mixture as claimed in claim 2, which is formed by first synthesizing the trisazo dyestuffs mixture of the formula,

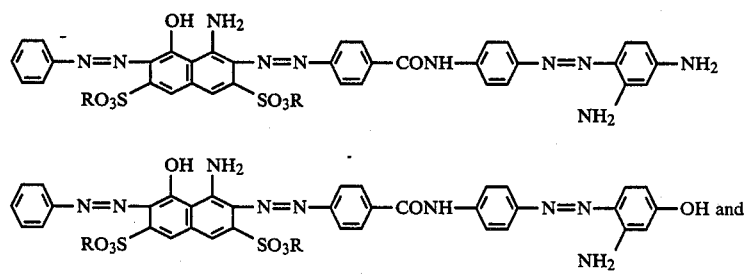

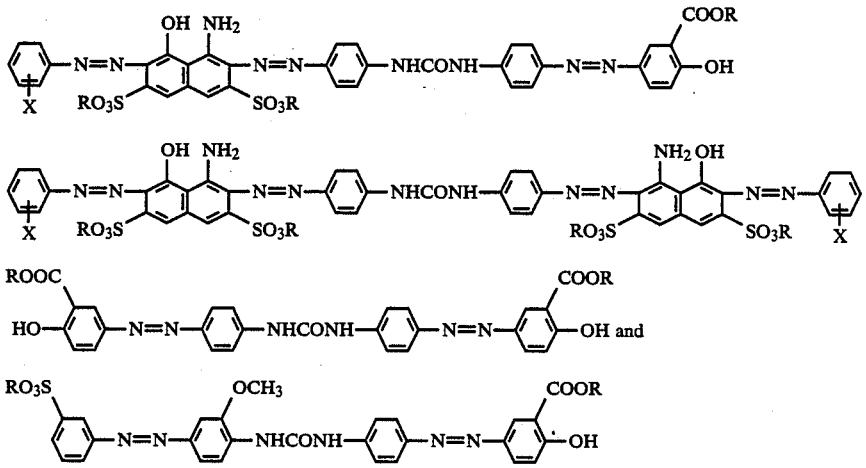

in situ and thereafter mechanically mixing the mixture of trisazo dyestuffs with the first, second and third polyazo dyestuffs and disazo dyestuff.

7. A dyestuffs mixture as claimed in claim 3, wherein the ingredients are in the dry state.

8. A dyestuffs mixture as claimed in claim 4, wherein the ingredients are in the dry state.

9. A dyestuffs mixture as claimed in claim 3, wherein the ingredients are in the wet state and dyestuffs mixture is dried at a temperature between about 75° to about 95° C.

10. A dyestuffs mixture as claimed in claim 4, wherein the ingredients are in the wet state and the dyestuffs mixture is dried at a temperature between about 75° to about 95° C.

11. A dyestuffs mixture as recited in claim 1 wherein X is methyl, ethyl, methoxy or ethoxy.

12. A dyestuffs mixture as recited in claim 2 wherein X is methyl, ethyl, methoxy or ethoxy.

13. A dyestuffs mixture as recited in claim 3 wherein X is methyl, ethyl, methoxy or ethoxy.

14. A dyestuffs mixture as recited in claim 4 wherein X is methyl, ethyl, methoxy or ethoxy.

15. A dyestuffs mixture as recited in claim 5 wherein X is methyl, ethyl, methoxy or ethoxy.

16. A dyestuffs mixture as recited in claim 6 wherein X is methyl, ethyl, methoxy or ethoxy.

17. A dyestuffs mixture as recited in claim 8 wherein X is methyl, ethyl, methoxy or ethoxy.

18. A dyestuffs mixture as recited in claim 10 wherein X is methyl, ethyl, methoxy or ethoxy.

* * * * *

UNITED STATES PATENT AND TRADEMARK OFFICE
CERTIFICATE OF CORRECTION

PATENT NO.  : 4,816,034
DATED       : March 28, 1989
INVENTOR(S) : Girish I. Bhatt et al.

It is certified that error appears in the above-identified patent and that said Letters Patent is hereby corrected as shown below:

On the title page, item [56] U.S. References Cited, in "Papa et al.", change subclass "644" to --641--

Column 3, line 9, change "no." to --No.--.

Column 3, line 18, change "id" to --is--.

Column 3, line 29, change "fraction" to --reaction--.

Column 3, line 31, delete "hours" and insert --hour--.

Column 3, line 37, after "10" delete "-".

Column 3, line 43, change "hydrochloride" to --hydrochloric--.

Column 3, line 56, delete "stireed" and insert --stirred--.

Column 3, line 59, delete "hours" and insert --hour--.

Column 4, line 8, change "no." to --No.--.

Column 4, line 20, after "formula" insert --,--.

UNITED STATES PATENT AND TRADEMARK OFFICE
CERTIFICATE OF CORRECTION

PATENT NO. : 4,816,034

DATED : March 28, 1989

INVENTOR(S) : Girish I. Bhatt et al.

It is certified that error appears in the above-identified patent and that said Letters Patent is hereby corrected as shown below:

In column 9, about line 8 to about line 25, delete

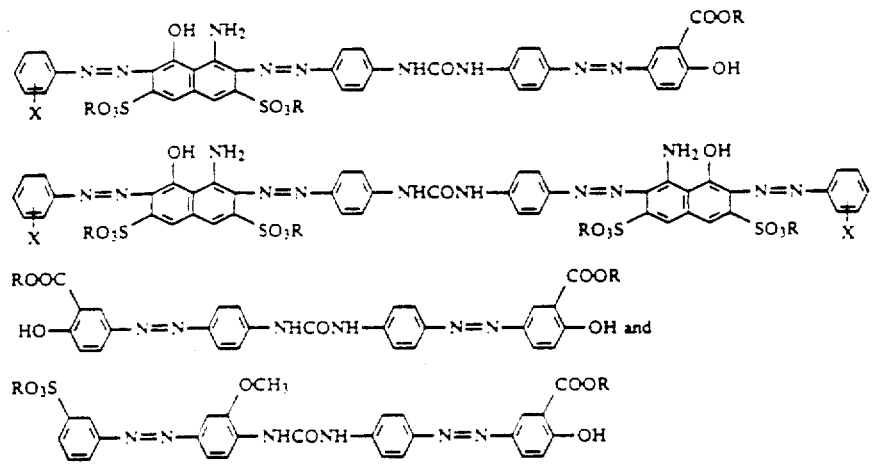

Column 9, line 36, after "and" insert --the--

Signed and Sealed this

Thirtieth Day of April, 1991

Attest:

HARRY F. MANBECK, JR.

Attesting Officer

Commissioner of Patents and Trademarks